UNITED STATES PATENT OFFICE.

CARL V. PETRAEUS, OF PHILADELPHIA, PENNSYLVANIA.

IMPROVEMENT IN PROCESSES FOR MANUFACTURING ALUMINA AND CARBONATE OF SODA.

Specification forming part of Letters Patent No. 222,154, dated December 2, 1879; application filed September 30, 1879.

*To all whom it may concern:*

Be it known that I, CARL VALDEMAR PETRAEUS, of Philadelphia, in the State of Pennsylvania, have invented a new and useful Process of Manufacturing Alumina and Carbonate of Soda from the Minerals known as "Cryolite" and "Bauxite," or other mineral having alumina in a free state, of which the following description is sufficient to enable those skilled in the art to which my invention appertains to practice the same.

It has been usual in dry processes in the manufacture of soda and alumina from bauxite and cryolite, when lime is used in connection with such manufacture, to furnace one or more of these substances during the process.

To do away with the necessity of roasting these materials, or either of them, is the object of my invention.

My process is as follows: I mix together cryolite and bauxite in a divided state. This mixture I boil with caustic lime and water, (milk of lime.) By this means the milk of lime reacts upon the cryolite and forms fluoride of calcium and aluminate of soda. The latter substance dissolves the alumina of the bauxite and forms acid aluminate of soda. This solution of aluminate of soda is drawn off from the sediment, and is treated with carbonic-acid gas, whereby are formed a precipitate of alumina and a solution of carbonate of soda. These substances may be collected in the usual manner.

The following proportions of materials may be employed in said process, viz: one hundred parts of cryolite, one hundred and twenty-five parts of lime slaked to dry powder, and ten parts of bauxite of sixty-five per cent. alumina. These proportions, however, may be departed from without changing the nature of my invention.

Having thus described my invention, I claim and desire to secure by Letters Patent of the United States—

The process of manufacturing hydrated alumina and carbonate of soda from cryolite and bauxite, which consists in boiling a mixture of bauxite and cryolite with milk of lime, separating the solution, and treating the clear liquor with carbonic-acid gas to form a precipitate of alumina and solution of carbonate of soda, substantially as described.

In testimony whereof I have hereunto signed my name this 25th day of September, A. D. 1879.

CARL V. PETRAEUS.

In presence of—
J. BONSALL TAYLOR,
W. C. STRAWBRIDGE.